Patented Oct. 6, 1936

2,056,930

UNITED STATES PATENT OFFICE 2,056,930

GLASS

Louis Navias, Schenectady, N. Y., assignor to General Electric Company, a corporation of New York No Drawing. Original application August 11, 1934, Serial No. 739,455. Divided and this application May 24, 1935, Serial No. 23,255

3 Claims. (Cl. 106—36.1)

The present invention relates to the glass art and its object is to produce a glass which is resistant chemically and physically to the decomposing and disintegrating effect of highly heated metallic vapors. In particular it is the object of my invention to provide a glass suitable for use as a protective coating or glaze upon the interior surface of sodium lamp bulbs, such as electric discharge sodium lamps, where the glaze is exposed to highly heated and therefore chemically active sodium vapor.

It has been proposed heretofore to coat glass containers which are not inert to hot alkali vapor with a borate which is substantially devoid of silica. Such borates are not resistant to moisture and weathering influence and tend to deteriorate before the bulb is sealed during the course of manufacture. Glasses containing silica in addition to boric oxide, and commonly termed borosilicates, have been found better suited for this purpose. In accordance with my present invention I have provided new and improved borosilicate glasses which are moisture-resistant while also being more inert chemically to hot sodium vapor and also are more transparent than the borosilicate glasses which have heretofore been employed.

In glasses embodying my invention the content of boric anhydride ($B_2O_3$) within the limits of about 20 to 50% and the content of silica ($SiO_2$) less than about 20% and preferably within the limits of about ½ to 15% make up the base-forming constituents which include barium oxide within the limits of about 25 to 50%.

As illustrative of my invention is a glass containing the following constituents:

Example 1

| | Parts |
|---|---|
| Sodium oxide ($Na_2O$) | 11 |
| Aluminum oxide ($Al_2O_3$) | 10 |
| Barium oxide (BaO) | 31 |
| Boron oxide ($B_2O_3$) | 40 |
| Silica ($SiO_2$) | 8 |

This glass is particularly suitable for use as a thin, protective coating or glaze applied on the interior of lamp bulbs of lime glass, which has a thermal coefficient of linear expansion of about 9 to 10 x $10^{-6}$ and which is not immune to alkali vapor. The proportion of the constituents of glasses made in accordance with my invention may be varied within the limits above indicated providing a proper relation is maintained between the basic and acid constituents to produce a glass having a desired coefficient of expansion and other desired physical characteristics.

For example, a glass also suitable for use as a protective glaze upon the interior of lime glass bulbs may have the following analysis:

Example 2

| | Parts |
|---|---|
| Sodium oxide ($Na_2O$) | 11 |
| Aluminum oxide ($Al_2O_3$) | 11 |
| Barium oxide (BaO) | 33 |
| Boron oxide ($B_2O_3$) | 42 |
| Silica ($SiO_2$) | 3 |

Glasses having the above compositions are particularly useful as glazes, or protective coatings on the inner surface of the bulb of lamps of the type shown in co-pending application Serial No. 642,882, filed November 16, 1932, by Andrew H. Young (see corresponding British Patent 405,232).

The preparation of a glass having an analysis within the limits indicated above is within the knowledge of the ordinary glass maker. However, for the purpose of illustration there is given below the composition of a batch of raw glass-forming materials which would yield by fusion (preferably in a platinum crucible) a glass having a composition within the limits characteristic of my invention. A batch yielding a glass having analysis corresponding to Example 1 may consist of the following ingredients:

| | Parts |
|---|---|
| Sodium carbonate (hydrated) | 14.0 |
| Sodium nitrate | 11.0 |
| Aluminum oxide | 10.0 |
| Barium carbonate | 39.9 |
| Boric acid | 71.1 |
| Quartz or other form of silica | 8.0 |

When the fusion is complete the platinum crucible may be quickly cooled to cause separation of the contents from the chilled walls of the crucible. The glass thus produced is crushed and ground while being kept free from moisture. The powdered product preferably is stored until desired for use in a space maintained at a temperature above 100° C. It may be applied to the inner surface of a lamp bulb while suspended in an organic liquid which is evaporated after the film has been applied. The residual film of powdered material is fused by heating the bulb until a substantially clear coating results.

This application is a division of my co-pending application Serial Number 739,455, filed August 11, 1934.

What I claim as new and desire to secure by Letters Patent of the United States, is:

1. A glass which is resistant to hot alkali metal vapor and containing barium oxide and other usual glass-forming constituents including alkali oxide, boric anhydride and silica, said glass being characterized by a content of barium oxide within the limits of about 25 to 50%, a content of boric anhydride within the limits of about 20 to 50% and a content of silica less than about 20%.

2. A glass which is resistant to hot alkali metal vapor containing as constituents oxide of an alkali metal, oxide of barium as well as alumina, boric anhydride and silica, said glass being characterized by a content of barium oxide from about 25 to 40%, a content of boric anhydride from 30 to 50% and a content of silica from about ½ to 15%.

3. A glass containing the following ingredients in the proportions indicated:

| | Parts |
|---|---|
| Sodium oxide ($Na_2O$) | 11 |
| Aluminum oxide ($Al_2O_3$) | 10 |
| Barium oxide (BaO) | 31 |
| Boron oxide ($B_2O_3$) | 40 |
| Silica ($SiO_2$) | 8 |

LOUIS NAVIAS.